US012663761B2

(12) United States Patent
Ko et al.

(10) Patent No.: US 12,663,761 B2
(45) Date of Patent: Jun. 23, 2026

(54) REMOTE TEMPERATURE SENSING WITH ENHANCED THERMAL COUPLING IN WEARABLE ELECTRONIC DEVICES

(71) Applicant: Apple Inc., Cupertino, CA (US)

(72) Inventors: Jacky G. Ko, Sunnyvale, CA (US); Han Bi, Santa Clara, CA (US); Saahil Mehra, Brookline, MA (US); Sinan Filiz, San Mateo, CA (US); Xinsheng Chu, Saratoga, CA (US); Zachary Gaubert, Austin, TX (US)

(73) Assignee: Apple Inc., Cupertino, CA (US)

( * ) Notice: Subject to any disclaimer, the term of this patent is extended or adjusted under 35 U.S.C. 154(b) by 629 days.

(21) Appl. No.: 17/891,838

(22) Filed: Aug. 19, 2022

(65) Prior Publication Data

US 2023/0093738 A1     Mar. 23, 2023

Related U.S. Application Data

(60) Provisional application No. 63/246,685, filed on Sep. 21, 2021.

(51) Int. Cl.
| | |
|---|---|
| *G04G 21/02* | (2010.01) |
| *G01K 1/16* | (2006.01) |
| *G04G 17/08* | (2006.01) |

(52) U.S. Cl.
CPC .............. *G04G 21/02* (2013.01); *G01K 1/16* (2013.01); *G04G 17/08* (2013.01)

(58) Field of Classification Search
CPC ............ G01K 1/16; G01K 1/18; G01K 13/20; G04G 21/02; G04G 17/08; G04G 17/02; G04G 17/04

(Continued)

(56) References Cited

U.S. PATENT DOCUMENTS

| | | | |
|---|---|---|---|
| 4,935,345 A | 6/1990 | Guilbeau | |
| 5,623,594 A | 4/1997 | Swamy | |

(Continued)

FOREIGN PATENT DOCUMENTS

| | | |
|---|---|---|
| CA | 2654084 | 12/2007 |
| CN | 101548881 | 10/2009 |

(Continued)

OTHER PUBLICATIONS

CN109245325A_translation.pdf Chen W Jan. 18, 2019.*

(Continued)

*Primary Examiner* — Kristina M Deherrera
(74) *Attorney, Agent, or Firm* — Brownstein Hyatt Farber Schreck, LLP

(57)     ABSTRACT

Disclosed herein are electronic devices, including wearable electronic devices, and components and configurations thereof, having one or more temperature sensors separated from the point of contact of the electronic device and an object, such as a user, whose temperature is being measured. In some embodiments, the electronic device includes both a temperature sensor and a light (visible, UV, and/or IR) emitter and sensor. Various embodiments are disclosed by which a temperature sensor may be shielded or separated from a light emitter/detector. A spacer may be used to separate the temperature sensor from the device's housing that contacts the object. The spacer may include a thermal path from the housing to the temperature sensor, and may be opaque to the light detected by a light detector.

21 Claims, 10 Drawing Sheets

(58) Field of Classification Search

USPC .......................................................... 374/208

See application file for complete search history.

(56) References Cited

U.S. PATENT DOCUMENTS

| | | | |
|---|---|---|---|
| 6,639,395 | B2 | 10/2003 | Male |
| 6,741,470 | B2 | 5/2004 | Isenburg |
| 7,299,090 | B2 | 11/2007 | Koch |
| 7,416,332 | B2 | 8/2008 | Rountree et al. |
| 7,479,116 | B2 | 1/2009 | Yarden et al. |
| 7,622,896 | B2 | 11/2009 | Nakagawa |
| 7,649,439 | B2 | 1/2010 | Thomsen, III |
| 7,852,710 | B2 | 12/2010 | Kelly et al. |
| 8,292,495 | B2 | 10/2012 | Bieberich et al. |
| 8,292,502 | B2 | 10/2012 | Bieberich et al. |
| 8,304,851 | B2 | 11/2012 | Trifonov |
| 8,550,702 | B2 | 10/2013 | Campbell et al. |
| 8,617,381 | B2 | 12/2013 | Sun et al. |
| 8,649,998 | B2 | 2/2014 | Yarden et al. |
| 8,954,288 | B2 | 2/2015 | Aljabari |
| 9,300,157 | B2 | 3/2016 | Bergqvist et al. |
| 9,304,520 | B2 | 4/2016 | Cheng |
| 9,326,097 | B2 | 4/2016 | Sen et al. |
| 9,438,071 | B1 | 9/2016 | Heiberg |
| 9,562,869 | B2 | 2/2017 | Mueller et al. |
| 9,599,520 | B2 | 3/2017 | Angeli et al. |
| 9,671,296 | B2 | 6/2017 | Niederberger et al. |
| 9,733,130 | B2 | 8/2017 | Blundell |
| 9,976,914 | B2 | 5/2018 | Radhakrishnan et al. |
| 9,990,172 | B2 | 6/2018 | Komaromi et al. |
| 9,993,178 | B2 | 6/2018 | Panescu et al. |
| 10,151,527 | B2 | 12/2018 | Rusnack et al. |
| 10,197,457 | B2 | 2/2019 | Jang et al. |
| 10,238,301 | B2 | 3/2019 | Weebadde et al. |
| 10,244,985 | B1 | 4/2019 | Sayani et al. |
| 10,309,840 | B2 | 6/2019 | Kalyanasundaram |
| 10,371,584 | B2 | 8/2019 | Kim et al. |
| 10,500,087 | B2 | 12/2019 | Thomas et al. |
| 10,553,179 | B2 * | 2/2020 | Holenarsipur ........ G01J 1/0492 |
| 10,555,436 | B1 | 2/2020 | Kalyanasundaram |
| 10,713,461 | B2 | 7/2020 | Benkley, III |
| 10,750,951 | B1 * | 8/2020 | Prachar .................. G01K 13/20 |
| 10,827,931 | B2 | 11/2020 | Meyerson et al. |
| 10,987,054 | B2 | 4/2021 | Pandya et al. |
| 11,224,344 | B2 | 1/2022 | Ellis et al. |
| 11,253,157 | B2 | 2/2022 | Tanaka et al. |
| 11,406,268 | B2 | 8/2022 | Tsuchimoto |
| 11,408,778 | B2 | 8/2022 | Clements et al. |
| 11,419,549 | B2 | 8/2022 | Shimuta |
| 11,519,875 | B2 | 12/2022 | Strandberg et al. |
| 11,557,709 | B2 | 1/2023 | Martinis |
| 2005/0139250 | A1 | 6/2005 | DeSteese et al. |
| 2005/0257822 | A1 | 11/2005 | Smith et al. |
| 2007/0290532 | A1 | 12/2007 | Frank |
| 2008/0234004 | A1 | 9/2008 | Logue et al. |
| 2010/0245090 | A1 | 9/2010 | Smith et al. |
| 2011/0119018 | A1 | 5/2011 | Skarp |
| 2011/0245713 | A1 | 10/2011 | Rensen et al. |
| 2012/0128024 | A1 * | 5/2012 | Tsuchida ................ G01K 13/20 |
| | | | 374/E17.001 |
| 2014/0163765 | A1 | 6/2014 | Jain et al. |
| 2014/0241399 | A1 | 8/2014 | Rud |
| 2015/0016487 | A1 | 1/2015 | Britton et al. |
| 2015/0259589 | A1 * | 9/2015 | Takagi ................ C09D 201/00 |
| | | | 252/75 |
| 2016/0058375 | A1 | 3/2016 | Rothkopf |
| 2017/0007167 | A1 | 1/2017 | Kostic et al. |
| 2017/0010672 | A1 | 1/2017 | Tanaka et al. |
| 2017/0288452 | A1 | 10/2017 | Adams et al. |
| 2018/0004169 | A1 | 1/2018 | Matsuzaki et al. |
| 2018/0028072 | A1 | 2/2018 | Shi |
| 2018/0206729 | A1 | 7/2018 | Wang et al. |
| 2019/0175024 | A1 | 6/2019 | Lan et al. |
| 2019/0377304 | A1 * | 12/2019 | Zhong .................... G04G 17/08 |
| 2021/0089168 | A1 | 3/2021 | Patel et al. |
| 2021/0121071 | A1 | 4/2021 | Mensch et al. |
| 2021/0186336 | A1 | 6/2021 | Bellifemine et al. |
| 2021/0264346 | A1 | 8/2021 | Momayez et al. |
| 2021/0278290 | A1 | 9/2021 | Ghoreyshi et al. |
| 2021/0404883 | A1 | 12/2021 | Rahmani et al. |
| 2022/0000370 | A1 | 1/2022 | Blom et al. |
| 2022/0013704 | A1 * | 1/2022 | Chen ...................... H10N 10/17 |
| 2022/0087534 | A1 | 3/2022 | Mansky et al. |
| 2022/0373404 | A1 | 11/2022 | Clements et al. |
| 2022/0377930 | A1 * | 11/2022 | Morimoto .......... H05K 7/20963 |
| 2022/0386878 | A1 | 12/2022 | Li et al. |
| 2023/0085860 | A1 | 3/2023 | Gaubert et al. |
| 2023/0414108 | A1 | 12/2023 | Lee et al. |

FOREIGN PATENT DOCUMENTS

| | | | |
|---|---|---|---|
| CN | 103873636 | 6/2014 | |
| CN | 104006895 | 8/2014 | |
| CN | 104204749 | 12/2014 | |
| CN | 205121417 | 3/2016 | |
| CN | 107145253 | 9/2017 | |
| CN | 108871609 | 11/2018 | |
| CN | 109245325 A * | 1/2019 | .............. H02J 50/10 |
| CN | 106706167 | 5/2019 | |
| CN | 110520873 | 11/2019 | |
| CN | 110546491 | 12/2019 | |
| CN | 112444322 | 3/2021 | |
| DE | 102009003848 | 11/2010 | |
| JP | 2012132818 | 7/2012 | |
| KR | 20180097191 | 8/2018 | |
| WO | WO 13/185679 | 12/2013 | |
| WO | WO 18/152566 | 8/2018 | |
| WO | WO 20/206372 | 10/2020 | |
| WO | WO 20/249665 | 12/2020 | |
| WO | WO 22/137895 | 6/2022 | |

OTHER PUBLICATIONS

U.S. Appl. No. 17/882,423, filed Aug. 5, 2022, Clements et al.

Maurer et al., "eWatch: a wearable sensor and notification platform," International Workshop on Wearable and Implantable Body Sensor Networks (BSN'06), Apr. 3-5, 2006, 4 pages.

U.S. Appl. No. 17/947,823, filed Sep. 19, 2022, Gaubert et al.

* cited by examiner

230

212        218a        234a
        208b 234b        218b
        208c

206

300

304    302

306

310

312

314

400a 403   402

404     405

400b

407

402

404

510

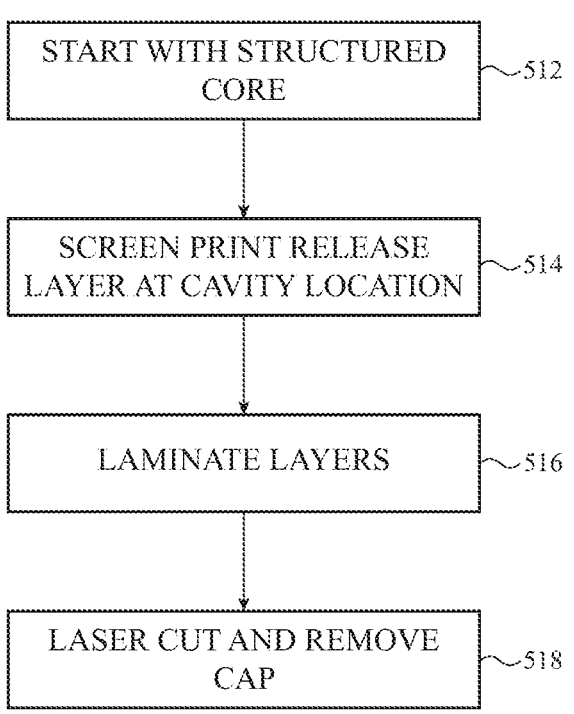

```
┌─────────────────────────────┐
│   START WITH STRUCTURED      │~512
│           CORE               │
└─────────────────────────────┘
              ↓
┌─────────────────────────────┐
│   SCREEN PRINT RELEASE       │~514
│  LAYER AT CAVITY LOCATION    │
└─────────────────────────────┘
              ↓
┌─────────────────────────────┐
│      LAMINATE LAYERS         │~516
└─────────────────────────────┘
              ↓
┌─────────────────────────────┐
│   LASER CUT AND REMOVE       │~518
│           CAP                │
└─────────────────────────────┘
```

*FIG. 5B*

REMOTE TEMPERATURE SENSING WITH ENHANCED THERMAL COUPLING IN WEARABLE ELECTRONIC DEVICES

CROSS-REFERENCE TO RELATED APPLICATIONS

This application claims the benefit under 35 U.S.C. § 119(e) of U.S. Provisional Patent Application No. 63/246,685, filed Sep. 21, 2021, the contents of which are incorporated herein by reference in their entirety.

FIELD

The present disclosure generally relates to temperature sensors and, more particularly, to temperature sensing by wearable electronic devices (e.g., electronic watches, health and fitness monitors, and so on).

BACKGROUND

Electronic devices are commonplace in today's society. Examples of electronic devices include electronic watches, health and fitness monitors, smart phones, tablet computers, and the like. Some of these electronic devices include temperature sensors that measure the temperature of an external object, such as a user's body. Some electronic devices also include other sensors, such as optical sensors.

In cases in which multiple types of sensors (e.g., temperature, light, pressure, or other types of sensors) are included in an electronic device, sensors of the same or different type may be electrically, magnetically, thermally, optically, or otherwise shielded from one other, from possible noise sources (aggressors), and so on, to improve their performance. For example, an optical sensor may be optically shielded so that it detects reflections of light from only particular objects or directions, or a temperature sensor may be thermally shielded so that it only detects a temperature of a particular object.

In electronic devices having limited internal space (which includes most of today's handheld and wearable electronic devices), it may also be useful to position a sensor at a location remote from an object or condition the sensor is sensing. For example, an optical sensor may be positioned at a location that is remote from an object it is optically sensing, and light emitted or received by the optical sensor may be optically guided, selectively blocked, and so on. As another example, a temperature sensor may be remotely located from a temperature sensing location and thermally coupled to the temperature sensing location via a conductive filament or the like.

SUMMARY

The below summary is provided to introduce a selection of concepts in simplified form. The concepts are further described in the Detailed Description. The below summary is not intended to identify key features or essential features of the claimed subject matter; nor is it intended to be used as an aid in determining the scope of the claimed subject matter.

Disclosed herein are systems, devices, methods, and apparatus pertaining to remote temperature sensing with enhanced thermal coupling. More specifically, and in some embodiments, a wearable electronic device is described. The device may include a housing having a first side opposite a second side, the first side forming an exterior surface to the electronic device; a spacer positioned interior to the housing and attached to the second side of the housing; and a temperature sensor positioned interior to the housing. The spacer may thermally conduct a temperature of the second side of the housing toward the temperature sensor.

In some embodiments, the wearable electronic device is a watch, and the housing includes a back crystal having an exterior that forms the first side, and an interior that forms the second side. In some embodiments, the spacer may be a polymer with at least a portion containing embedded thermally conductive particles that form a thermal path for conducting the temperature of the second side of the housing toward the temperature sensor. In additional and/or alternative embodiments, the spacer may be a metal spacer. In additional and/or alternative embodiments, the spacer may include, or may be attached to, a printed circuit board having a set of metal layers connected by at least one metal via, with the set of metal layers conducting the temperature of the housing toward the temperature sensor.

Also described is a temperature sensing device that may include a thermally conductive component having a first side operable to be placed in contact with an object exterior to the temperature sensing device, and a second side opposite to the first side. The device may also include a separation layer positioned adjacent to the second side of the thermally conductive component, and a temperature sensor positioned on a side of the separation layer opposite to the thermally conductive component. The separation layer may define at least a portion of a thermal path from a temperature sensing location on the second side of the thermally conductive component to the temperature sensor.

The present disclosure also describes an electronic device that may include a housing, which housing includes a cover having a first side that forms an exterior surface of the electronic device, and a second side, opposite to the first side, that faces interior to the electronic device. The cover may be transmissive to a first set or range of light wavelengths. The electronic device may also include a spacer positioned interior to the electronic device and attached to the second side of the cover. The spacer may define a void area, and may be opaque to a second set or range of light wavelengths that includes at least some of the light wavelengths in the first set or range of light wavelengths. The electronic device may also include a light detector positioned in the void area and operable to receive light through the cover, and a temperature sensor positioned interior to the electronic device. The spacer may define a thermal path from a temperature sensing location on the second side of the cover to a temperature sensing input of the temperature sensor.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements.

FIG. 5B is a flow chart of a method of creating the printed circuit board of FIG. 5A, according to an embodiment.

Figure 1A:
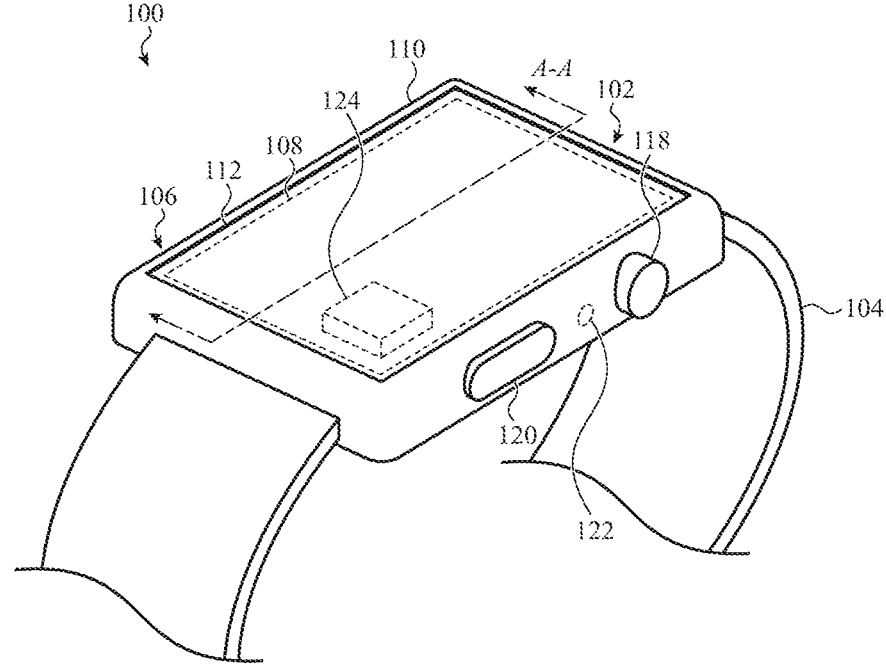
FIG. 1A illustrates a top view of a wearable electronic device, according to an embodiment.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments described herein are directed to electronic devices, including wearable electronic devices, such as electronic watches or health and fitness monitors, that include one or more temperature sensors. Such electronic devices may also include other sensors, such as optical sensors, pressure sensors, or other sensors. For the cases of electronic watches and health and fitness monitors, the sensors may obtain biometric measurements, such as body temperature, pulse rate, blood oxygenation level, and blood pressure, among others.

The embodiments described herein may include any of various types of temperature sensors. Examples of such temperature sensors include bimetal junctions, thermistors, thermocouples, silicon bandgap temperature sensors, and integrated circuit temperature sensors, among others.

Temperature sensors may operate by being placed in direct contact with the body or object for which temperature is being measured. Electronic devices such as electronic watches or health and fitness monitors that attach to a user's body, among other electronic devices that include temperature sensors, often have a housing that contacts the object and reaches the same temperature as the object, at least at a temperature sensing location on the housing.

In some electronic devices, it may be acceptable for the temperature sensor to be attached to the interior side of the housing, near the temperature sensing location. However, in some embodiments, such as those that include light emitters and detectors, a temperature sensor attached to the interior side of the electronic device's housing may interfere with light emission or detection. Certain embodiments described herein are configured for remote temperature sensing and include one or more temperature sensors that are not in direct contact with the housing of the electronic device. Instead, a spacer or separation layer may be positioned so that a first side of the spacer is on or adjacent to the interior surface of the housing, with the temperature sensors being on, near, or adjacent to the opposite side of the spacer or separation layer.

In various embodiments disclosed herein, the spacer or separation layer may be configured to define one or more thermal paths from the interior surface of the housing to (or near to) the temperature sensor. Such thermal paths may operate to conduct heat from the temperature sensing location on the housing, through the spacer or separation layer, to a location where the temperature sensor is located (e.g., on, near, or adjacent to an opposite side of the spacer or separation layer). For convenience of terminology, the physical conduction of heat from a temperature sensing location on the housing, through the spacer or separation layer to a temperature sensor, in order to infer the temperature at the temperature sensing location, will be described simply as conducting heat or conducting temperature from that temperature sensing location to the temperature sensor. Hereinafter, the term "spacer" will also refer to a separation layer.

In some cases, the spacer may be configured to facilitate additional functionality besides remote temperature sensing. For example, certain embodiments may include light emitters and/or sensors for additional parameter sensing, such as an electronic watch in which the housing has a transparent (or partially transparent) back cover that contacts a user's skin. Hereinafter "light emitter/detector" will refer to one or more components or devices that include one or both of a light emitter and a light detector. Light may be emitted through the back cover, with reflections thereof being used by a device to detect motion of the user's skin from which the user's heart rate or other parameters may be inferred. The light emitter/detector may be at least partially enclosed by the spacer so that the spacer may provide shielding of the light emitter/detector from ambient or extraneous light entering the light detector. The spacer may be configured and/or made of a material that is opaque to a range or set of light wavelengths used by the light emitter/detector. The spacer may also contain metallic or conductive components configured to provide electromagnetic shielding to the interior of the electronic device.

These and other embodiments are discussed below with reference to FIGS. 1A-6. However, those skilled in the art will readily appreciate that the detailed description given herein with respect to these Figures is for explanatory purposes only and should not be construed as limiting.

Further, although specific electronic devices are shown in the figures and described below, the components of the electronic devices described herein may be used with various electronic devices including, but not limited to, mobile phones, personal digital assistants, time keeping devices, health or fitness monitoring devices, contact pads of smart glasses, a health sensing puck, and so on. Although various electronic devices are mentioned, the electronic devices or components thereof may also be used in conjunction with other products and/or combined with various other components.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Figure 1B:
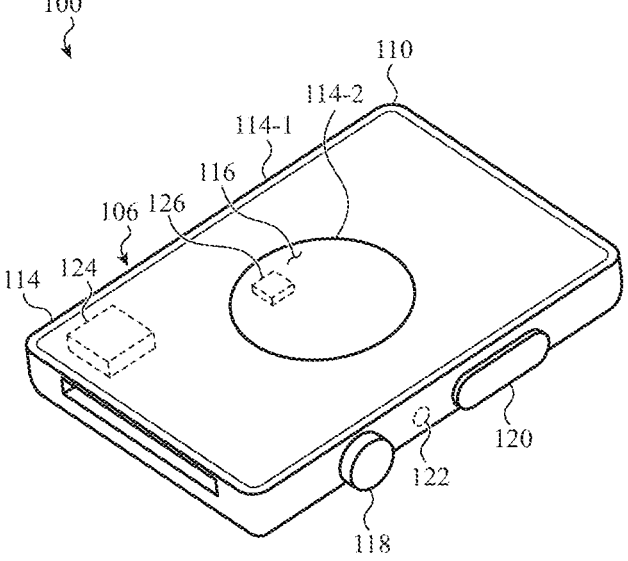
FIG. 1B illustrates a bottom view of a wearable electronic device, according to an embodiment.

FIGS. 1A and 1B show an example of a device 100 (an electronic device) that includes a set of sensors. The sensors may be used, for example, to acquire biological information from the wearer or user of the device 100 (e.g., a skin temperature, heart rate, respiration rate, blood pressure, blood flow rate, blood oxygenation, blood glucose level, and so on), or to determine a status of the device 100 (e.g., whether the device 100 is being worn or a tightness of the device 100). The device's dimensions and form factor, and inclusion of a band 104 (e.g., a wrist band), suggest that the device 100 is an electronic watch, fitness monitor, or health diagnostic device. However, the device 100 could alternatively be any type of wearable device. FIG. 1A shows a front isometric view of the device 100, and FIG. 1B shows a back isometric view of the device 100.

The device 100 may include a body 102 (e.g., a watch body) and a band 104. The body 102 may include an input or selection device, such as a crown 118 or a button 120. The band 104 may be attached to a housing 106 of the body 102 and may be used to attach the body 102 to a body part (e.g., an arm, wrist, leg, ankle, or waist) of a user. The body 102 may include a housing 106 that at least partially surrounds a display 108. In some embodiments, the housing 106 may include a sidewall 110, which sidewall 110 may support a front cover 112 (FIG. 1A) and/or a back cover 114 (FIG. 1B). The front cover 112 may be positioned over the display 108 and may provide a window through which the display 108 may be viewed. In some embodiments, the display 108 may be attached to (or abut) the sidewall 110 and/or the front cover 112. In alternative embodiments of the device 100, the display 108 may not be included and/or the housing 106 may have an alternative configuration The display 108 may include one or more light-emitting elements including, for example, light-emitting elements that define a light-emitting diode (LED) display, organic LED (OLED) display, liquid crystal display (LCD), electroluminescent (EL) display, or other type of display. In some embodiments, the display 108 may include, or be associated with, one or more touch and/or force sensors that are configured to detect a touch and/or a force applied to a surface of the front cover 112.

In some embodiments, the sidewall 110 of the housing 106 may be formed using one or more metals (e.g., aluminum or stainless steel), polymers (e.g., plastics), ceramics, or composites (e.g., carbon fiber). The front cover 112 may be formed, for example, using one or more of glass, a crystal (e.g., sapphire), or a transparent polymer (e.g., plastic) that enables a user to view the display 108 through the front cover 112. In some cases, a portion of the front cover 112 (e.g., a perimeter portion of the front cover 112) may be coated with an opaque ink to obscure components included within the housing 106. In some cases, all of the exterior components of the housing 106 may be formed from a transparent material, and components within the device 100 may or may not be obscured by an opaque ink or opaque structure within the housing 106.

The back cover 114 may be formed using the same material(s) that are used to form the sidewall 110 or the front cover 112. In some cases, the back cover 114 may be part of a monolithic element that also forms the sidewall 110. In other cases, and as shown, the back cover 114 may be a multi-part back cover, such as a back cover having a first back cover portion 114-1 attached to the sidewall 110 and a second back cover portion 114-2 attached to the first back cover portion 114-1. The second back cover portion 114-2 may in some cases have a circular perimeter and an arcuate exterior surface 116 (i.e., an exterior surface 116 having an arcuate profile).

The front cover 112, back cover 114, or first back cover portion 114-1 may be mounted to the sidewall 110 using fasteners, adhesives, seals, gaskets, or other components. The second back cover portion 114-2, when present, may be mounted to the first back cover portion 114-1 using fasteners, adhesives, seals, gaskets, or other components.

A display stack or device stack (hereafter referred to as a "stack") including the display 108 may be attached (or abutted) to an interior surface of the front cover 112 and extend into an interior volume of the device 100. In some cases, the stack may include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 112 (e.g., to a display surface of the device 100).

The device 100 may include various sensors. In some embodiments, the device 100 may have a port 122 (or set of ports) on a side of the housing 106 (or elsewhere), and an ambient pressure sensor, ambient temperature sensor, internal/external differential pressure sensor, gas sensor, particulate matter concentration sensor, or air quality sensor may be positioned in or near the port(s) 122.

In some cases, one or more skin-facing sensors 126 may be included within the device 100. The skin-facing sensor(s) 126 may emit or transmit signals through the housing 106 (or back cover 114) and/or receive signals or sense conditions through the housing 106 (or back cover 114). For example, in some embodiments, one or more such sensors may include a number of electromagnetic radiation emitters (e.g., visible light and/or IR emitters) and/or a number of electromagnetic radiation detectors (e.g., visible light and/or IR detectors, such as electromagnetic radiation detectors including any of the detector pixels described herein). The sensors may be used, for example, to acquire biological information from the wearer or user of the device 100 (e.g., a heart rate, respiration rate, blood pressure, blood flow rate, blood oxygenation, blood glucose level, and so on), or to determine a status of the device 100 (e.g., whether the device 100 is being worn or a tightness of the device 100).

Additionally and/or alternatively, the device 100 may include temperature sensors, as described more fully below, that may be used, for example, to detect skin or body temperature of the wearer or user. Examples of such temperature sensors include bimetal junctions, thermistors, thermocouples, silicon bandgap temperature sensors, infrared light detectors, integrated circuit temperature sensors, among others.

The device 100 may include circuitry 124 (e.g., a processor and/or other components) configured to determine or extract, at least partly in response to signals received directly or indirectly from one or more of the device's sensors, biological parameters of the device's user and/or a status of the device 100, for example. In some embodiments, the circuitry 124 may be configured to convey the determined or extracted parameters or statuses via an output device of the device 100. For example, the circuitry 124 may cause the indication(s) to be displayed on the display 108, indicated via audio or haptic outputs, transmitted via a wireless communications interface or other communications interface, and so on. The circuitry 124 may also or alternatively maintain or alter one or more settings, functions, or aspects of the device 100, including, in some cases, what is displayed on the display 108.

Figure 2A:
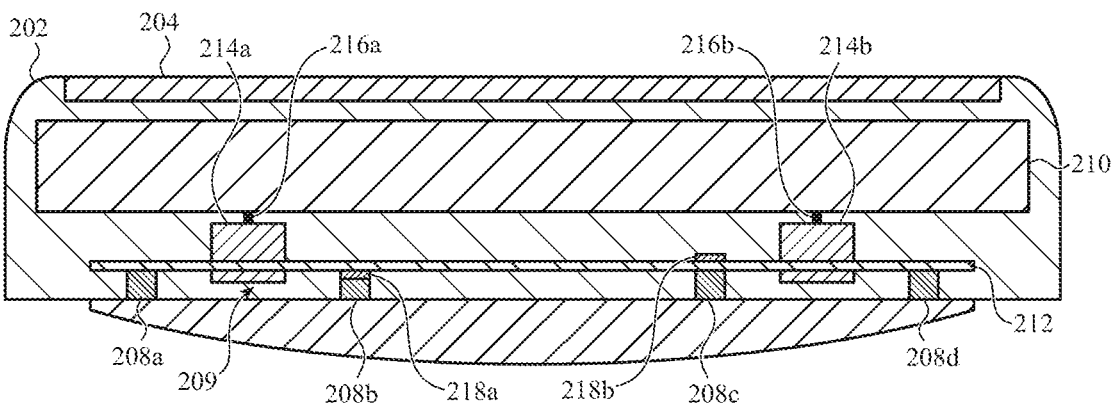
FIG. 2A illustrates a cross-sectional view of the wearable electronic device of FIGS. 1A-B, according to an embodiment.
Figure 2B:
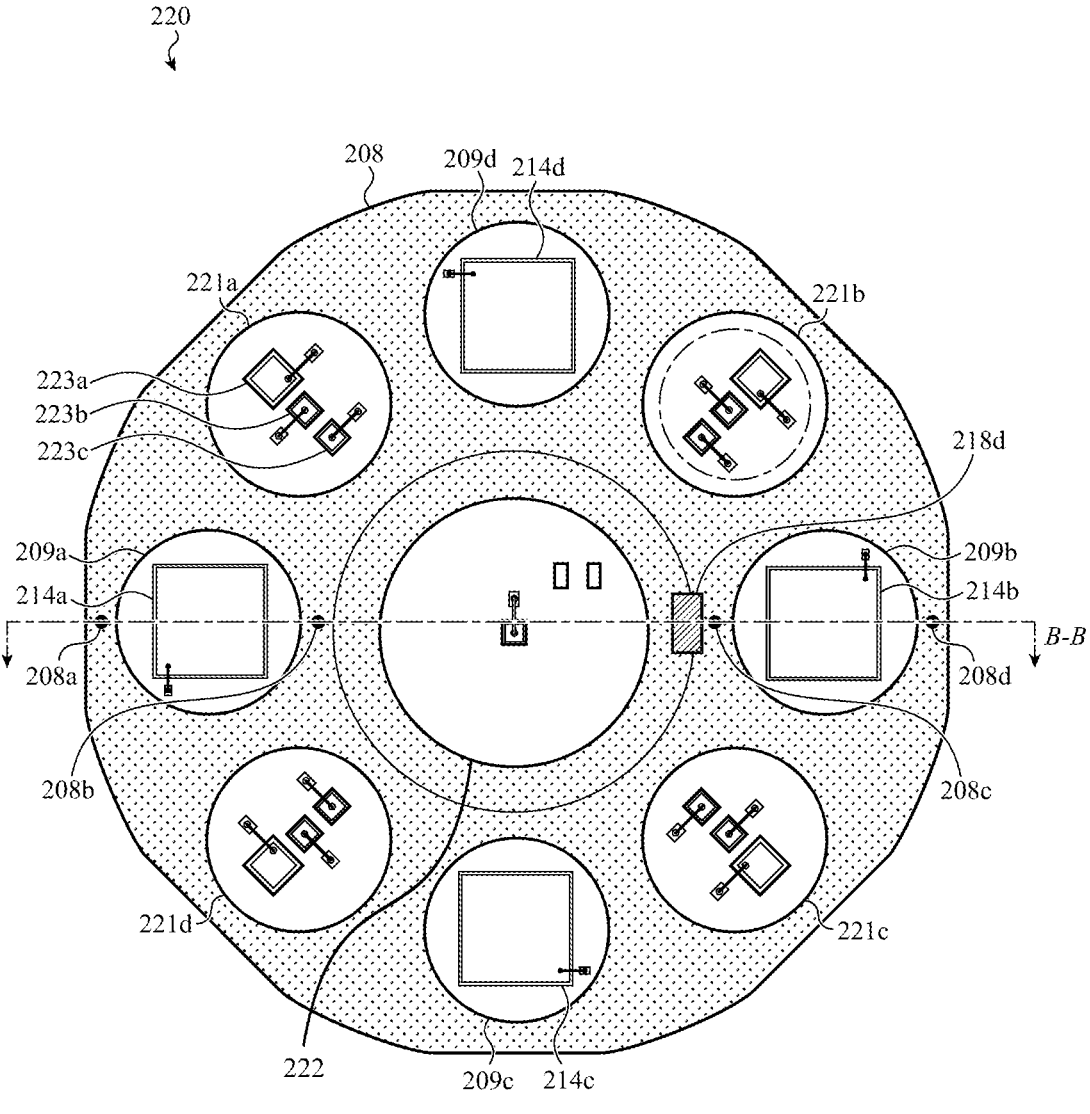
FIG. 2B illustrates a plan view of a component of the wearable electronic device of FIGS. 1A-B, according to an embodiment.
Figure 2C:
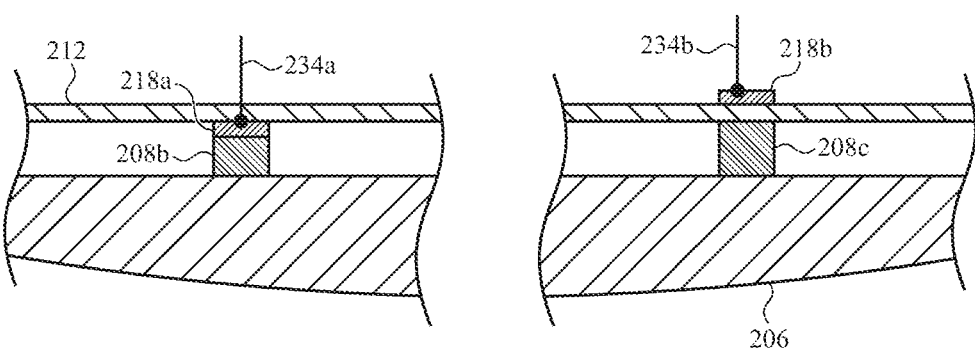
FIG. 2C illustrates a cross-sectional view of a section of the wearable electronic device of FIGS. 1A-B, according to an embodiment.

FIGS. 2A-C illustrate an embodiment of the device 100, its components, and their configuration that include remote temperature sensing functionality. The embodiment shown in FIGS. 2A-C, like the embodiment shown in FIGS. 1A-B, is a wearable watch 202. One skilled in the art will recognize that the scope of the disclosure described with respect to the wearable watch 202 shown in FIGS. 2A-C includes other electronic devices, including, but not limited to, attachable health monitors, fitness monitors, or other temperature sensing devices. The wearable watch 202 may include multiple sensors types.

FIG. 2A illustrates a cross-sectional view 200 along the cut line A-A' of the device 100 shown in FIG. 1A. The wearable watch 202 includes a display device 204, that may include a display (such as LED, OLED, or another light emitting element) beneath a cover component, which may be glass, plastic, or another material. The wearable watch 202 may include a battery and electronics assembly 210. Though shown as a single component, one skilled in the art will recognize that the battery and electronics assembly 210 may be implemented as one or multiple components, with multiple components having various interconnections. The battery and electronics assembly 210 may include processors, timers, drivers, memory, batteries and other components. Further details of the components of the wearable watch 202 are provided in relation to FIG. 6, below. The battery and electronics assembly 210 may be connected with the display device 204 to convey information to a user.

The wearable watch 202 may include a housing that includes the back cover 206. The back cover 206 may include, at least in part, an optically clear material, such as glass, plastic, polymer, or another material. A portion of the material of the back cover 206 may pass, at least in part, a range or set of light wavelengths. For example, the back cover 206 may pass some or all of the visible spectrum, the ultraviolet spectrum, or the infrared spectrum. An exterior surface of the back cover 206 may contact a user's body, either directly on the user's skin, or through a material worn by the user. The back cover 206 may be of a shape and material that provides good thermal conductivity between a point of contact of the exterior surface of the back cover 206 and a user's body, and allows the temperature of an interior surface (or portion) of the back cover 206 to quickly reach the temperature of the user's body. In such a case, the back cover 206 acts as a thermally conductive component that transfers the user's body temperature to an interior temperature sensing location of the back cover 206.

The interior of the wearable watch 202 may include a spacer 208, shown in more detail in FIG. 2B. In the cross-sectional view 200, the spacer 208 has spacer sections (or walls) 208a, 208b, 208c, and 208d that extend from a printed circuit board (PCB) 212 to the interior side of the back cover 206. The spacer 208 may be formed with gap sections or void areas, such as 209a, formed between spacer sections 208a and 208b. A similar void area may be formed between the spacer sections 208c and 208d of the spacer 208. FIG. 2B below shows an embodiment of the spacer 208 with further void areas. The spacer 208 may be affixed to the interior of the back cover 206 by an adhesive layer (not shown), such as a pressure sensitive adhesive (PSA). Similarly, the spacer 208 may be affixed to the PCB 212 with a PSA or by another method or component.

In various embodiments, the spacer 208 may include the PCB 212 as a single component, or may be formed as a single unit from initial components, such as described further below. Portions of the spacer 208 and/or the PCB 212 may conduct temperature from one or more temperature sensing locations at which it contacts the interior side of the back cover 206 to a temperature sensor.

The wearable watch 202 includes the temperature sensor 218a located between the spacer section 208b and the PCB 212. Connections between the temperature sensor 218a and, for example, the battery and electronics assembly 210, are not shown, but will be understood by one skilled in the art. The wearable watch 202 also includes a second temperature sensor 218b, located on a side of the PCB 212 opposite to the spacer section 208c. Other embodiments may have a single temperature sensor, or more than two temperature sensors, or one or more temperature sensors located in different locations.

The wearable watch 202 may include two or more light emitter/detectors 214a and 214b. The light emitter/detectors 214a and 214b may include a light source, such as light emitting diode (LED), laser light source or another light source, that emits light through the back cover 206 toward the user's body. The emitted light may be a pulsed waveform or a continuous waveform. The light emitter/detectors 214a and 214b may have light detectors, such as photodiodes, arrays of photodiodes, CMOS detectors, or another type of light detector. The light received may include reflections of the emitted light that are returned through the back cover 206, or may include ambient light. The light emitter/detectors 214a and 214b may be positioned on a side of the spacer 208 facing the back cover 206, or within respective void areas of the substrate and directed toward the back cover 206. The light emitter/detectors 214a and 214b may be operable to detect, for example, motion of the user's skin, from which may be inferred biometric data such as heart rate, blood pressure, blood oxygenation level, or other biometric data. The light emitter/detectors 214a and 214b may respectively have connections 216a and 216b to the battery and electronics assembly 210. Though the light emitter/detectors 214a and 214b are described as having both a light emitter and a light detector, one skilled in the art will recognize that other embodiments having only one are within the scope of this disclosure.

The spacer 208 and/or the PCB 212 may surround the light emitter/detectors 214a and 214b, or components thereof, and may be made of material that is opaque to the range of light wavelengths emitted and/or received by the light emitter/detectors 214a and 214b. The spacer 208 and/or the PCB 212 may thus shield the light emitter/detectors 214a and 214b from extraneous light not received through the back cover 206. The light emitter/detectors 214a may be formed within void area 209.

FIG. 2B illustrates a plan view 220 of the spacer 208, which in this embodiment is a single unit or layer. In other embodiments, a spacer may include two or more separated pieces (e.g., a planar substrate having one or more walls attached thereto). The cross-sectional view along the cut line B-B in the plan view 220 is the same as the cross-sectional view 200 shown in FIG. 2A. The spacer 208 is formed with multiple void areas. In the particular embodiment of FIG. 2B, the void areas 221a, 221b, 221c and 221d enclose respective light emitters, such as light emitters 223a, 223b, and 223c in the void area 221a. The spacer 208 is also formed with further void areas 209a, 209b, 209c and 209d that respectively contain the light detectors 214a, 214b, 214c and 214d. Though the void areas 209a-d and 221a-d are circular shaped and arranged in an alternating circular pattern toward the periphery of the spacer 208, and around a central void area 222 also containing a light emitter, this is not required. Other numbers, shapes, and arrangements of void areas or gaps in the spacer 208 for enclosing light emitters and/or detectors are within the scope of this embodiment. Further, one skilled in the art will recognize that one or more void areas may enclose a combination light emitter and detector, as previously described.

The light emitters 223a, 223b, and 223c may be positioned within the void area 221a of the spacer 208. The light emitters 223a, 223b, and 223c may emit light in a set or range of wavelengths, such as infrared, visible, or ultraviolet. Though multiple light emitters 223a, 223b, and 223c are shown positioned within the void area 221a, this is not required; more or fewer may be used in other embodiments. One or more of the light emitters 223a, 223b, and 223c may emit light in a single direction toward and through the back cover 206. The emitted light may reflect from an object exterior to the wearable electronic device, such as a user's skin, and be received by one or more of the light detectors 214a-d. In some embodiments, the light emitters 223a-c may be positioned within the void area 221a so that the emitted light is directed at angle so that reflections thereof from an object are received at the light detector 214a, with similar respective directional light emission by light emitters in void areas 221b-d and detection by the light detectors 214b-d.

The light detectors 214a-d may be implemented as any of CMOS detectors, charge-coupled devices, or another type of detector. The light detectors 214a-d may be connected to the other electronic components, such as on the PCB 212, or to the battery and electronics assembly 210.

The spacer 208 may be configured with a thickness and material sufficiently opaque to shield the light detectors 214a-d from receiving at least most light not originating from the light emitters 223a-c. Various specific configurations of the spacer 208 are presented in relation to FIGS. 3A-C. The spacer 208 may be configured so that the void areas 209a-d and 221a-d are wells in the material of the spacer 208 that do not extend all the way through the spacer 208.

FIG. 2C illustrates a detailed view 230 of the cross-sectional view 200 described in relation to FIG. 2A. The temperature sensor 218a is shown positioned between the spacer section 208b and the PCB 212. The temperature sensor 218a may be positioned or affixed to a location on the surface of the spacer 208 directly, such as with a PSA or another connection technology. Such a location may be where a thermal path within the spacer 208 approaches the surface location. In additional and/or alternative embodiments, there may be one or more additional layer between the temperature sensor 218a and the spacer 208. The additional layer may be an epoxy or PSA layer configured to conduct heat laterally to the location at which the temperature sensor 218a is located.

The temperature sensor 218b is shown in an alternate position on a side of the PCB 212 opposite to the spacer section 208c. As the two temperature sensors 218a and 218b are located on a side of the spacer 208 opposite from the back cover 206, and as the spacer 208 (or portions thereof) and/or the PCB 212 may include thermal paths from interior side of the back cover 206, the two temperature sensors 218a and 218b may measure the user's temperature without being in direct contact with the back cover 206. In some embodiments, the back cover 206 may be configured with portions that extend a thermal path within the spacer 208, through the back cover 206 to a location on the exterior surface of the back cover 206.

Figures 3A, 3B:
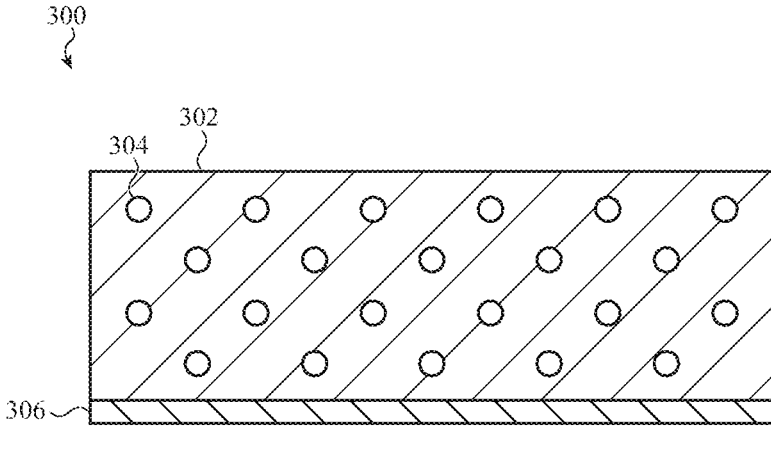
FIG. 3A illustrates a cross-sectional view of polymer layer of an electronic device, according to an embodiment.
FIG. 3B illustrates a cross-sectional view of metal layer of an electronic device, according to an embodiment.
Figure 3C:
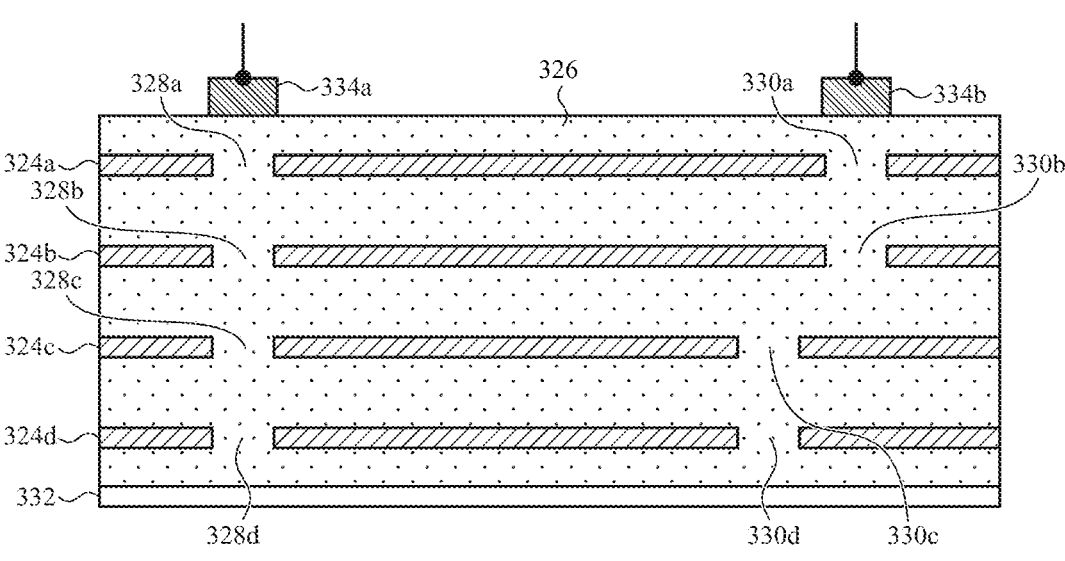
FIG. 3C illustrates a cross-sectional view of printed circuit board with thermal paths, according to an embodiment.

FIGS. 3A-C illustrate three embodiments of spacers. The spacers may include the PCB 212 as a single unit, or may be separate components.

FIG. 3A illustrates a cross-sectional view 300 of portion of a spacer 302. The portion of the spacer 302 may be formed of a polymer and have at least a portion containing embedded thermally conductive particles 304. The embedded thermally conductive particles 304 may extend through the spacer 302 from one side of the spacer 302, at a location adjacent to the housing where the temperature is to be measured, to a location on the opposite side of the spacer 302, at which a temperature sensor may be positioned. As an example, the spacer 302 may be configured as the spacer 208 of FIG. 2B, with the embedded thermally conductive particles 304 embedded at least at the spacer section 208b. The portion of spacer 302 containing the embedded thermally conductive particles 304 may thus be operable as a thermal path to conduct a temperature at a location on the interior side of the housing toward the temperature sensor, such as temperature sensor 218a.

For embodiments of electronic devices having light emitters/detectors, the polymer selected for the spacer 302 may be opaque or non-transmissive to the range of wavelengths emitted and/or received by the light emitter/detector. The embedded thermally conductive particles 304 may be or include a metal, such as aluminum, gold, alloy of iron or steel, or another metal, or may be formed of a non-metallic material.

The spacer 302 may be joined to the housing with an adhesive layer 306. The adhesive layer 306 may be a pressure sensitive adhesive. The adhesive layer 306 may be thermally conductive. The spacer 302 may be formed with one or more void areas in which respective light emitter/detectors are positioned, as described above. An electronic device with a spacer 302 with embedded thermally conductive particles 304 may be as described for the wearable electronic device 202 of FIG. 2A, except that the PCB 212 need not be used.

FIG. 3B illustrates a cross-sectional view 310 of at least a portion or section of a spacer 312 formed from metallic material, such as aluminum, gold, iron alloy, or another metal or metallic alloy. The spacer 312, or at least the metallic portion, may be joined to a housing of the electronic device by an adhesive layer 314, which may be a pressure sensitive adhesive, and may be thermally conductive. The metallic material may be selected to provide good thermal conductivity between a location on the housing of the electronic device to a temperature sensor positioned on the side of the spacer 312 opposite the housing. Alternatively, a temperature sensor may be positioned in or on a printed circuit board, such as PCB 212, to which the spacer 312 may be linked or attached. The spacer 312 may be formed with one or more void areas in which respective light emitter/detectors are positioned, as described above. The metal selected for the metallic portion or section of the spacer 312 may be opaque or non-transmissive to the range of wavelengths emitted and/or received by the light emitter/detector. Such a metallic portion of the spacer 312 may encircle a void area. The metallic section of the spacer 312 may be shaped to provide electromagnetic shielding, such as from microwaves, for the electronic components within the electronic device. The metallic portion of the spacer 312 may be formed in the spacer 312 as an insert molding, or by another technology. The metallic portion of the spacer 312 may serve as an electrical ground, and may be connected with other electrical components by a thermally conductive epoxy formed on a surface of the metallic portion of the spacer 312.

FIG. 3C illustrates a cross-sectional view 320 of a third embodiment of a spacer 322. The spacer 322 is formed as a PCB and includes metallic layers 326 interleaved with dielectric layers 324a-d. The interleaved metallic and dielectric layers 326 and 324a-d may be formed with one or more vias, such as vias 328a-d or 330a-d, that provide a metallic interconnection between the metallic layers 326 or allow temperature to thermally conduct along a thermal path through the interleaved metallic and dielectric layers 326 and 324a-d.

The metallic layers 326 together with the metallic interconnections formed by the respective sets of vias 328a-d and 330a-d form two thermal paths to the respective temperature sensors 334a and 334b. An adhesive layer 332 may join the spacer 322 to an interior side of a housing of an electronic device.

Figures 4A, 4B:
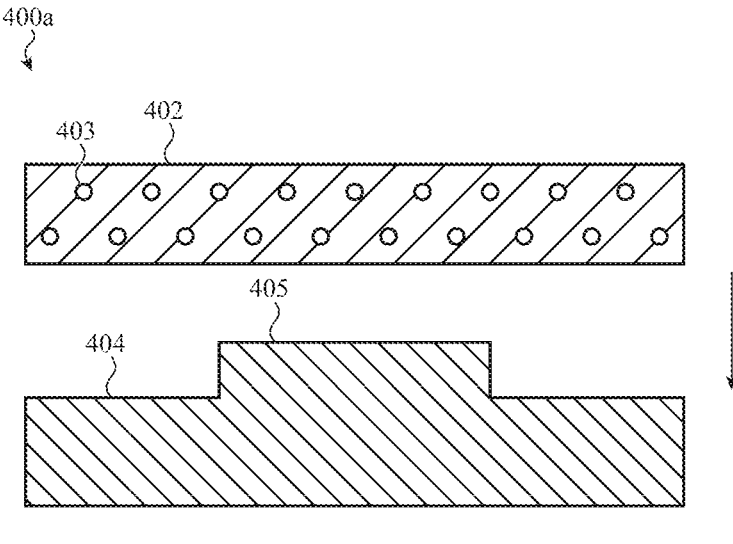
FIG. 4A illustrates a spacer and a polymer layer, according to an embodiment.
FIG. 4B illustrates a joined spacer and polymer layer, according to an embodiment.

FIGS. 4A and 4B illustrate respective cross-sectional views 400a and 400b that show how a polymer layer 402, containing embedded thermally conductive particles 403 may be joined to a base layer 404 to form a combination spacer or separation layer that may be positioned on or adjacent to an interior side of a housing of an electronic device. A temperature sensor may then be placed on the combination spacer opposite to the interior side of the housing to provide remote temperature sensing.

FIG. 4A illustrates the separated polymer layer 402 and the base layer 404. The polymer layer 402 includes embedded thermally conductive particles 403, and may be as described for the spacer 302 of FIG. 3A. The polymer layer 402 may also be thermally anisotropic, in that heat may more readily flow across it (in the vertical direction of FIG. 4A) than flow laterally. The included embedded thermally conductive particles 403 may have an initial density that may add only limited extra thermal conductivity to the polymer layer 402.

In some embodiments, the polymer layer 402 may be an adhesive layer, such as a pressure sensitive adhesive, which may be used to link the combination spacer either to the interior of the housing of the electronic device, or to an internal component of the electronic device, such as the PCB 212 of FIG. 2A.

The base layer 404 may be another polymer layer, possibly of a different material than that of the polymer layer 402, or may be a metal spacer as described in relation to FIG. 3B, or may be a PCB, such as described in relation to FIG. 3C. The base layer 404 may include a raised section 405 that extends above a mostly planar side of the base layer 404. The base layer 404 may contain a thermal path extending to and/or into the raised section 405.

FIG. 4B illustrates that the polymer layer 402 may be joined to the base layer 404 through compression. An adhesive layer or material (not shown) may be used to form a bond. The raised section 405 of the base layer 404 causes a compression at the portion 407 of the polymer layer 402. This compression may cause the included embedded thermally conductive particles 403 at the portion 407 either to come in contact or to have an increased density. In either case, an increased thermal conductivity across the portion 407 may result. Together with an extent thermal path in the base layer 404 extending to the raised section 405, this may provide a completed thermal path across the combination spacer formed by the polymer layer 402 and the base layer 404.

Figure 5A:
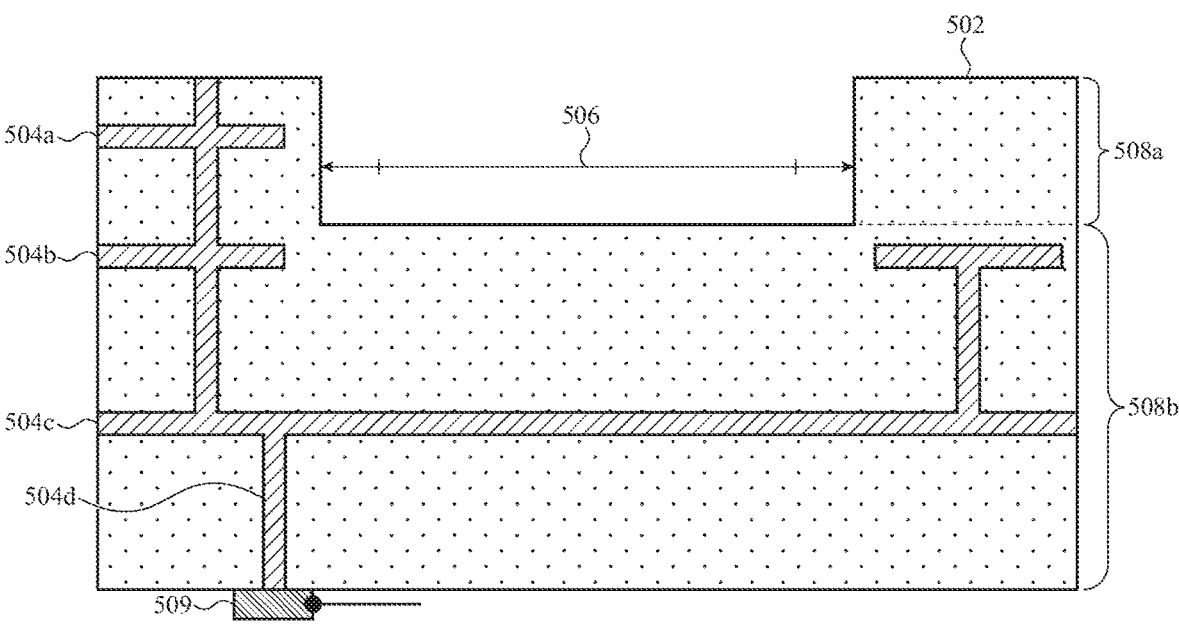
FIG. 5A illustrates a printed circuit board with thermal paths and component cavity, according to an embodiment.

In another set of embodiments, one or more thermal paths and temperature sensors may be embedded in or on a PCB that also contains one or more voids or cavities into which light emitters/detectors, or other sensors, may be embedded. These embodiments are illustrated in FIGS. 5A-B. In these embodiments, the PCB may function as the spacer 208 to separate the temperature sensors from direct contact with the housing of the electronic device. Such a PCB may also include one or more thermal paths that conduct temperature from the housing of the electronic device to a temperature sensor.

FIG. 5A illustrates a cross-sectional view 500 of a PCB 502 in which a cavity 506 has been formed. The PCB 502 may be used as a spacer between a housing of an electronic device, or in conjunction with a spacer such as described above in relation to FIGS. 2A and FIGS. 3A-B.

The PCB 502 may be structured as alternating layers of dielectric material and metallic material, as described above in relation to FIG. 3C. The PCB 502 contains the metallic layers and interconnecting vias 504a-d, which may be as described in relation to FIG. 3C. The PCB 502 shown in FIG. 5A is configured so that the top is to be positioned on or adjacent to a housing of an electronic device of which the PCB 502 is a component. The metallic layers and interconnecting vias 504a-d may form a thermal path to connect a temperature sensing location on the housing to the temperature sensor 509, positioned on the PCB 502 on its interior side with respect to the electronic device. Additionally and/or alternatively, the metallic layers and interconnecting vias 504a-d may be formed within the PCB 502 to provide at least partial electromagnetic shielding to electronic device.

The cavity 506 may be formed to contain a light emitter/detector, which may emit light through a light transmissive section of the housing, upwards in the orientation shown in FIG. 5A. The electrical connections for such a light emitter/ detector are not shown, as one skilled in the art will recognize that they would be included. The cavity 506 may be formed by addition of metallic and/or dielectric layers, such as the metallic and/or dielectric layers in the portion 508*a*, onto an initial base portion 508*b*, followed by subtraction of the portion of those added layers at the location of the cavity 506. The added layers may be selected to be opaque or non-transmissive to the range of light wavelengths emitted or received by the light emitter/detector to be inserted into the cavity 506.

FIG. 5B is flow chart of a method 510 by which the cavity 506 of the PCB 502 described in relation to FIG. 5A may be formed. At stage 512, initial base portion 508*b* of a PCB is used. The initial base portion 508*b* may contain one or more dielectric and metallic layers, such as metallic layers 504*b-d* shown in FIG. 5A, and the interconnecting metallic vias.

At stage 514, a release layer is deposited or applied at a location on the top the initial base portion 508*b* at which the cavity 506 is to be formed. The release layer may prevent adhesion between subsequently added dielectric or metallic layers and the initial base portion 508*b*. The release layer may be added by a screen printing operation.

At stage 516, subsequent metallic and/or dielectric layers, such as metallic layer 504*a*, are laminated or otherwise added to the initial base portion 508*b*.

At stage 518, a laser cutting operation is performed to excise the section of the subsequently laminated layers at which the cavity 506 is to be formed. The release layer may allow that section to be excised without machining operations.

Figure 6:
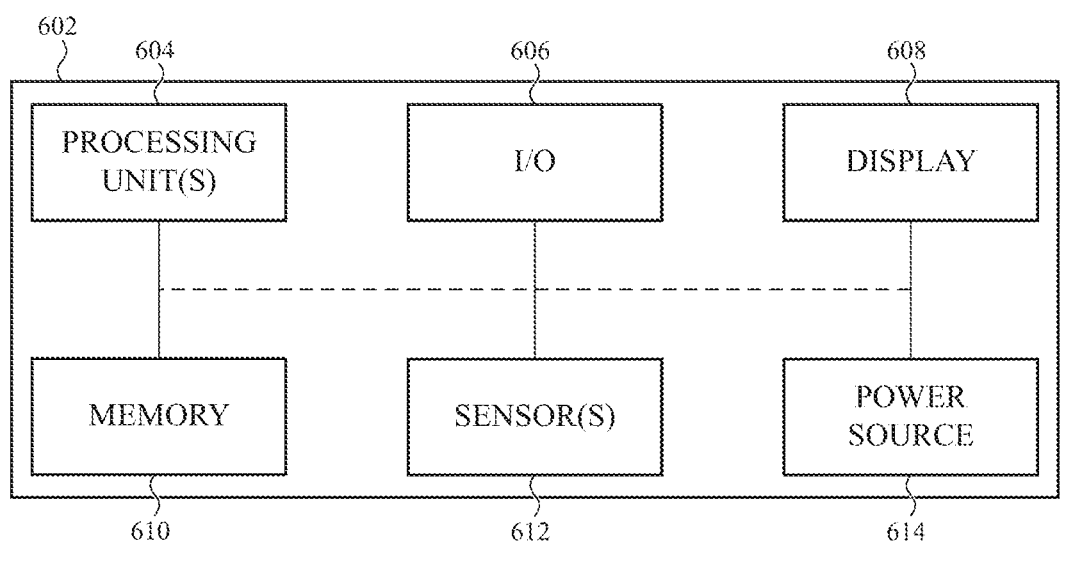
FIG. 6 is a block diagram of an electronic device, according to an embodiment.

FIG. 6 depicts an example block diagram of at least some of the components of the wearable electronic device described herein, in accordance with some embodiments. The wearable electronic device 602 may include one or more processing units 604, an input/output mechanism 606 (e.g., an input/output device, input/output port, a button, a haptic output interface, or the combination thereof), a display 608 (e.g., a light-emitting display), a memory 610 or a storage device, one or more sensors 612, and a power supply 614. By way of example, the input/output mechanism may include a communication module to communicate with another electronic device and/or an application server using a Wi-Fi, Bluetooth, 3G, 4G, 5G, and/or another communication protocol, and so on. The one or more processing units 604 can communicate, either directly or indirectly, with some or all of the components of the wearable electronic device 602. For example, a system bus or other communication mechanism can provide communication between the one or more processing units 604, the power supply 614, the memory 610, the one or more sensors 612, and the input/output mechanism 606, and the display 608.

The one or more processing units 604 may be implemented as any electronic device capable of processing, receiving, or transmitting data or instructions. By way of example, the one or more processing units 604 may be a microcontroller, a microprocessor, a central processing unit (CPU), an application-specific integrated circuit (ASIC), an integrated circuit (IC), a field-programmable gate array (FPGA), a digital signal processor (DSP), and/or a system-on-chip (SOC), and so on. Accordingly, the term "processing unit" is meant to encompass a single processor or processing unit, multiple processors, multiple processing units, or other suitably configured computing element or elements.

In some embodiments, various components of the wearable electronic device 602 may be controlled by multiple processing units. For example, select components of the wearable electronic device 602 (e.g., a sensor 612) may be controlled by a first processing unit and other components of the wearable electronic device 602 (e.g., the display 608) may be controlled by a second processing unit, where the first and second processing units may or may not be in communication with each other.

In some embodiments, an input may be processed through a number of processing units. Each processing unit of the number of processing units may process the received input according to the instructions set corresponding to that processing unit, and then may forward or send a command to other processing unit for further processing.

In some embodiments, the power supply 614 may be implemented with any device capable of providing energy to the wearable electronic device 602. For example, the power supply 614 may be one or more batteries or rechargeable batteries. By way of example, the power supply 614 may be a power connector or power cord that connects the wearable electronic device 602 to another power source, such as a wall outlet.

In some embodiments, the memory 610 may store electronic data that may be used by the wearable electronic device 602. For example, the memory 610 may store electrical data or content such as, for example, software instructions, algorithms, audio and video files, documents and applications, device settings and user preferences, timing signals, control signals, and data structures or databases. The memory 610 may be configured as any type of memory. By way of example, the memory 610 may be implemented as random access memory (RAM), read-only memory (ROM), static random-access memory (SRAM), Flash memory, removable memory, and/or a hard disk, and so on.

In some embodiments, the wearable electronic device 602 may include one or more sensors 612 positioned almost anywhere on the wearable electronic device 602. The one or more sensors 612 may be configured to sense one or more type of parameters, which by way of example may include temperature, pressure, light, touch, movement, relative motion, and/or biometric data (e.g., biological parameters), and so on. By way of example, in some embodiments, the one or more sensors 612 may include a force sensor, temperature sensor, a position sensor, a light or optical sensor, an accelerometer, a pressure transducer, a gyroscope, a magnetometer, a health monitoring sensor, and so on. In some embodiments, the force sensor may be implemented as a strain gauge. Additionally, the one or more sensors 612 may utilize any suitable sensing technology, including, but not limited to, capacitive, ultrasonic, resistive, optical, ultrasound, piezoelectric, and thermal sensing technology In some embodiments, the I/O mechanism 606 may transmit and/or receive data from a user or another electronic device. An I/O device may include a display, a touch sensing input surface, one or more buttons (e.g., a graphical user interface "home" button, a physical button such as a tact switch button, and/or a bongo button), one or more cameras, one or more microphones or speakers, one or more ports such as a microphone port, and/or a keyboard. In some embodiments, by way of example, an I/O device or port can transmit electronic signals via a communications network, such as a wireless and/or wired network connection. Examples of wireless and wired network connections include, but are not limited to, cellular, Wi-Fi, Bluetooth, IR, and Ethernet connections.

The foregoing description, for purposes of explanation, used specific nomenclature to provide a thorough understanding of the described embodiments. However, it will be apparent to one skilled in the art that the specific details are not required in order to practice the described embodiments.

Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A wearable electronic device, comprising:
a housing comprising a back cover, the back cover having a first side opposite a second side, the first side forming an exterior surface to the wearable electronic device, and the second side defining an interior surface of the back cover;
a spacer coupled to the interior surface of the back cover; and
a temperature sensor positioned interior to the housing; wherein,
the spacer thermally conducts a temperature of the second side of the back cover toward the temperature sensor.

2. The wearable electronic device of claim 1, wherein:
the wearable electronic device is a watch; and
the first side of the back cover is a domed surface.

3. The wearable electronic device of claim 1, wherein:
the spacer includes a polymer with embedded thermally conductive particles; and the embedded thermally conductive particles have a higher thermal conductivity than the polymer; and
a density of the embedded thermally conductive particles, in at least a portion of the spacer, increases heat conduction through at least the portion of the spacer in comparison to another portion of the spacer.

4. The wearable electronic device of claim 1, further comprising:
an adhesive positioned between the spacer and the second side of the back cover; wherein,
the spacer includes a localized raised section facing the second side of the back cover; and
the localized raised section compresses a localized portion of the adhesive between the localized raised section and the second side of the back cover; and
the compressed localized portion of the adhesive has an increased thermal conductivity in comparison to a portion of the adhesive adjacent the localized portion of the adhesive.

5. The wearable electronic device of claim 4, wherein the adhesive comprises an anisotropic conductive film.

6. The wearable electronic device of claim 1, further comprising:
a non-thermally conductive pressure sensitive adhesive positioned between the spacer and the second side of the housing; and
a thermally conductive pressure sensitive adhesive positioned between the spacer and the second side of the back cover.

7. The wearable electronic device of claim 1, further comprising:
a light detector disposed within a void area of the spacer; wherein,
at least a portion of the housing is optically transmissive to a set of one or more wavelengths of light sensed by the light detector; and
the light detector is operable to receive the set of one or more wavelengths of light through the portion of the housing; and
the spacer forms an optical barrier to the set of one or more wavelengths of light.

8. The wearable electronic device of claim 1, wherein the spacer includes a portion that is metal.

9. The wearable electronic device of claim 1, wherein:
the spacer includes a printed circuit board having a set of metal layers and a set of dielectric layers;
the printed circuit board has at least one metallic via that thermally conducts the temperature of the second side of the housing toward the temperature sensor.

10. The wearable electronic device of claim 9, wherein at least one metal layer in the set of metal layers also thermally conducts the temperature of the second side of the housing toward the temperature sensor.

11. The wearable electronic device of claim 1, wherein:
the temperature sensor is a first temperature sensor;
the wearable electronic device includes a second temperature sensor positioned interior to the housing; and
the spacer thermally conducts a first temperature of the second side of the housing toward the first temperature sensor along a first thermal path defined by the spacer, and the spacer thermally conducts a second temperature of the second side of the back cover toward the second temperature sensor along a second thermal path defined by the spacer.

12. A temperature sensing device, comprising:
a thermally conductive component having a first side operable to be placed in contact with an object exterior to the temperature sensing device and a second side opposite to the first side;
a separation layer coupled to the second side of the thermally conductive component; and
a temperature sensor coupled on a side of the separation layer opposite to the thermally conductive component; wherein,
the separation layer defines at least a portion of a thermal path from a temperature sensing location on the second side of the thermally conductive component to the temperature sensor.

13. The temperature sensing device of claim 12, wherein the separation layer includes a metal layer.

14. The temperature sensing device of claim 12, wherein:
the separation layer includes a printed circuit board;
the printed circuit board includes at least one via forming at least part of the at least portion of the thermal path.

15. The temperature sensing device of claim 12, wherein:
the separation layer includes a polymer layer; and
the at least portion of the thermal path includes multiple thermally conductive particles within the polymer layer.

16. The temperature sensing device of claim 15, further comprising:
an adhesive positioned between the separation layer and the second side of the thermally conductive component; wherein,
the separation layer includes a localized raised section facing the second side of the thermally conductive component;
the localized raised section compresses a localized portion of the adhesive between the localized raised section and the second side of the thermally conductive component; and
the compressed localized portion of the adhesive has an increased thermal conductivity in comparison to a portion of the adhesive adjacent to the localized portion of the adhesive.

17. An electronic device, comprising:
a housing including a cover, a first side of the cover forming an exterior surface to the electronic device and a second side of the cover opposite to the first side of the cover and facing interior to the electronic device, the cover transmissive to a first range of light wavelengths;

a spacer positioned interior to the electronic device and attached to the second side of the cover, the spacer defining a void area, and the spacer opaque to a second range of light wavelengths that includes at least some light wavelengths in the first range of light wavelengths;

a light detector positioned in the void area and operable to receive light wavelengths of a third range of light wavelengths that includes at least some light wavelengths in the first range of light wavelengths through the cover;

a temperature sensor positioned interior to the electronic device; wherein, the spacer defines a thermal path from a temperature sensing location on the second side of the cover to a temperature sensing input of the temperature sensor.

18. The electronic device of claim 17, wherein a portion of the spacer comprises a metal layer.

19. The electronic device of claim 17, wherein:

the spacer includes a printed circuit board having a thermally conductive via, the thermally conductive via defining at least part of the thermal path in the spacer.

20. The electronic device of claim 17, wherein:

the spacer includes a polymer layer; and the thermal path includes multiple thermally conductive particles within the polymer layer.

21. The electronic device of claim 17, wherein:

the spacer includes a portion comprising a thermally conductive epoxy; and the thermally conductive epoxy is opaque to at least some of the light wavelengths of the third range of light wavelengths.

* * * * *